United States Patent Office 3,475,541
Patented Oct. 28, 1969

3,475,541
TREATMENT OF EPILEPSY WITH POLYGLYCEROLS AND POLYGLYCEROL ESTERS
Spencer M. Fossel, Morristown, N.J., assignor to Unimed, Inc., Morristown, N.J.
No Drawing. Original application Oct. 14, 1965, Ser. No. 496,170. Divided and this application June 13, 1967, Ser. No. 645,611
Int. Cl. A61k 27/00
U.S. Cl. 424—307    5 Claims

ABSTRACT OF THE DISCLOSURE

This invention relates to the treatment of epilepsy by the use of a series of compounds of the polyglycerol and polyglycerol ester type which are marked by a high degree of effectiveness in the treatment of epilepsy and by a complete lack of toxicity and lack of undesired side effects.

CROSS REFERENCE TO RELATED APPLICATIONS

This application is a divisional of my copending application Ser. No. 496,170, filed Oct. 14, 1965, for "Treatment of Epilepsy, Glaucoma and Constipation," which application is in turn a continuation-in-part of application Ser. No. 405,829, filed Oct. 22, 1964, for "Treatment of Epilepsy and Glaucoma," both of which are now abandoned.

BACKGROUND OF THE INVENTION

Substances such as dilantoin have been used in the treatment of grand mal. However, these substances have the undesired effect of a tendency to stimulate petit mal. Attempts have been made to find substances useful in the treatment of grand mal which do not have this undesired side effect, and also which have as low a toxicity as possible.

SUMMARY OF THE INVENTION

Generally speaking, in accordance with the present invention, epilepsy in human beings is treated by administering to a patient suffering from the same an effective amount of either a polyglycerol or a polyglycerol ester, or a polyethylene glycol wherein the "poly" is at least "tri," or polypropylene glycol wherein the "poly" is at least "tri," or a mixed polymer of propylene oxide and etheylene oxide, or a polymer formed by the reaction of ethylene oxide with 1-amino-2-hydroxy ethanol.

Accordingly, it is a primary object of the present invention to provide compositions and treatments for epilepsy, and more particularly for the treatment of epilepsy in human beings, and to depress the occurrence of grand mal without at the same time stimulating any occurrence of petit mal.

It is yet a further object of the present invention to provide compositions and treatments for epilepsy without at the same time causing any undesired side effects.

Other objects and advantages of the present invention will be apparent from a further reading of the specification and of the appended claims.

Although the invention is applicable to the use of either a polyglycerol or a polyglycerol ester or a polyethylene glycol, or a polypropylene glycol, or a polymer of ethylene oxide and propylene oxide, or a polymer of ethylene oxide and 1-amino-2-hydroxyethanol, the most preferred substances for the purposes of the invention are the polyglycerols and the polyglycerol esters.

The use of the polyglycerols and polyglycerol esters for the purposes of the present invention provide numerous advantages. Aside from the advantages in effectivity, which will be further discussed below, one of the primary advantages of these compounds is that the body is able to utilize the polyglycerols and polyglycerol esters just like common fats and oils so that there is no accumulation or toxic effect whatsoever even upon extensive and high dosage use of these substances. As a matter of fact, these substances are so safe that the Food and Drug Adminstration has approved use of these substances in foods.

I have discovered, however, that these substances in addition to the safety which permits their use as and in foods, have marked effectiveness in the treatment of epilepsy.

One of the advantages of the use of the polyglycerols and polyglycerol esters in accordance with the present invention for the treatment of epilepsy is that these substances are particularly effective in overcoming grand mal without, however, having the undesired effect of substances such as dilantoin of having a tendency to stimulate petit mal. Consequently, the polyglycerols and polyglycerol esters of the present invention are more effective in the treatment of grand mal than is dilantoin.

Another advantage of the present invention is that it is possible by adjusting the degree of esterification of the polyglycerols to adjust the speed of the relief in the body so that it is possible to provide either quick acting compositions, slow acting compositions, or compositions which both act quickly and over a prolonged period of time.

While glycerin itself might have some suitability in use as a treatment of epilepsy, the compounds of the present invention provide several advantages, in addition to greater effectiveness, over glycerin. One of the advantages is that glycerin cannot be taken as freely as the polyglycerols and polyglycerol esters of the present invention, because prolonged and extensive administration of glycerin can cause gastric and other upsets. Furthermore, glycerin is highly unpalatable and is difficult to take in concentrated form. The polyglycerols and polyglycerol esters of the present invention, on the other hand, can easily be taken in concentrated form. In fact, those polyglycerols and polyglycerol esters can be taken in the form of capsules for the viscous liquid polyglycerols and polyglycerol esters, and in capsule or tablet form for the solid, powdered polyglycerols and polyglycerol esters.

Among the most suitable polyglycerols and polyglycerol esters for purposes of the present invention are:

Triglycerol
Hexaglycerol
Decaglycerol
Triglycerol monostearate
Triglycerol monooleate
Hexaglycerol monostearate
Hexaglycerol monooleate
Hexaglycerol dioleate
Hexaglycerol hexaoleate
Decaglycerol monostearate
Decaglycerol monooleate
Decaglycerol monolaurate
Decaglycerol tristearate
Decaglycerol trioleate
Decaglycerol trilinoleate
Decaglycerol decastearate
Decaglycerol decaoleate
Decaglycerol decalinoleate
Triglycerol mono shortening ("Drewpol 3–1–SH")
Hexaglycerol mono shortening ("Drewpol 6–1–SH")
Hexaglycerol di shortening ("Drewpol 6–2–SH")
Decaglycerol mono shortening ("Drewpol 10–1–SH")
Decaglycerol tri shortening ("Drewpol 10–3–SH")
Diglycerol
Tetraglycerol Pentaglycerol
Hexaglycerol
Heptaglycerol
Octaglycerol
Monaglycerol
Pentaglycerol monostearate
Triglycerol mono cottenseed
Pentaglycerol mono cottenseed
Triglycerol mono hydrogenated cottenseed
Pentaglycerol mono hydrogenated cottonseed The preferred glycerols and glycerol esters for the purpose of the present invention are triglycerol, decaglycerol, hexaglycerol, triglycerol monostearate, hexaglycerol distearate, decaglycerol tetraoleate, and decaglycerol tristearate. The most preferred substances are decaglycerol, decaglycerol monopalmitate and decaglycerol tetralinoleate.

It can be seen, however, from the above list, that the invention is applicable to all of the polyglycerols and particularly the polyglycerols from diglycerol to decaglycerol and partial and complete esters thereof with $C_2$ to $C_{24}$ fatty acids which are either saturated, mono-unsaturated or poly-unsaturated.

The dosage of the polyglycerols and polyglycerol esters of the present invention in the treatment of epilspsy will vary depending upon the molecular weight of the particular polyglycerol or polyglycerol esters as well as upon the number of hydroxyl groups thereof. A typical dosage is about 10 grams, three times a day. However, much lower dosages of as little as 1–2 grams, three time a day, and as high as 30–50 grams, three times a day, can be used. As mentioned above, the advantage of the polyglycerols and polyglycerol esters of the present invention in the complete lack of toxicity.

Although the invention is not meant to be limited as to any specific theory as to how any of the compounds which are used according to this invention achieve the desired effect, the following theory is given in the hope that it will help other investigators in this art and will aid in the research in this field. The invention is, of course, not lmited to the theory.

It is believed that the polyglycerols act by means of distribution across membranes which results in an adjustment of osmotic pressures. The polyglycerols as well as the polyglycols of this invention are molecules of relatively large size and apparently cross membranes with less facility than do smaller molecules such as glycerol itself or the lower glycols. In addition, the polyglycerols and the higher polyglycols of the invention do not enter the triose-phosphate and other meta-bolic pathways as readily as glycerol and the lower glycols, and consequently, the compounds of the invention have a more effective therapeutic half life.

The lower glycols such as ethylene glycol and diethylene glycol are readily metabolized to or readily contribute to undesired concentrations of oxalate ions, and therefore, these substances have not found acceptance for human consumption. However, the triethylene glycol and higher ethylene glycols act similarly to the polyglycerols and can be suitably used for the purposes of the present invention.

As a practical matter, the polyethylene glycols, and likewise the polypropylene glycols should not be used beyond a molecular weight of about 12,000. This higher molecular weight limitation is mainly a practical limitation because the higher polymers tend to become less and less water soluble or easily dispersible in physiological fluids.

The same comments apply with respect to the mixed polymers of propylene oxide and ethylene oxide and to the mixed polymers of ethylene oxide and 1-amino-2-hydroxyethanol.

The compounds of the invention are useful for the purposes of the invention whereas ordinary dietary proteins do not produce these beneficial effects. These ordinary dietary proteins include caseine and albumen, and the same are readily hydrolyzed to amino acids by proteolytic enzymes. On the other hand, the compounds of the invention are not metabolized readily by the body, they have a low antigenicity and are readily usable for the purposes of this invention.

Description of preferred embodiments

The following examples are given to further illustrate the invention. The scope of the invention is not, however, meant to be limited to the specific details of these examples.

EXAMPLE 1

Large gelatin capsules are filled with 5 grams each of decaglycerol. In the treatment of epilepsy, particularly grand mal, the patient is told to take 2 capsules, three times a day. It is found that these capsules are wholly effective in reducing epileptic seizures.

EXAMPLE 2

Gelatin capsules are filled with 5 grams of decaglycerol monopalmitate. These capsules are administered as 2 capsules, three times a day, for the treatment of epilepsy.

EXAMPLE 3

Large sized gelatin capsules are filled with 10 grams each of decaglycerol trilinoleate. These capsules are administered by being taken orally in the form of 1 to 2 capsules, three times a day, for the treatment of epilepsy

EXAMPLE 4

Large gelatin capsules are filled with 5 grams each of triethylene glycol. These capsules can be administered as two capsules, three times a day, for the reduction of epileptic seizures.

EXAMPLE 5

Gelatin capsules are filled with 5 grams each of decapropylene glycol. These capsules are administered orally, two capsules, three times a day, for the treatment of epileptic seizures.

EXAMPLE 6

Large sized gelatin capsules are filled with 10 grams each of mixed polymer formed from 3 molecules of propylene oxide and 3 molecules of ethylene oxide. These capsules are administered in the form of 1 to 2 capsules, three times a day, for the treatment of epilepsy.

Capsules are similarly filled with the reaction product of 3 molecules of ethylene glycol with 3 molecules of 1-amino-2-hydroxyethanol, and used in the same manner.

What is claimed is:

1. Method of treating epilepsy, which comprises orally administering to a patient suffering from the same, an effective amount of a substance selected from the group consisting of polyglycerols, polyglycerol fatty esters, polyethylene glycols wherein "poly" is at least "tri" and wherein the molecular weight is up to 12,000.

2. Method according to claim 1 wherein said substance is decaglycerol.

3. Method according to claim 1 wherein said substance is decaglycerol monopalmitate.

4. Method according to claim 1 wherein said substance is decaglycerol trilinoleate.

5. Method according to claim 1 wherein the daily dose is about 5–30 grams administered 1–3 times per day.

References Cited

UNITED STATES PATENTS 3,320,314   5/1967   Houlihan _____ 260—556

ALBERT T. MEYERS, Primary Examiner

S. J. FRIEDMAN, Assistant Examiner

U.S. Cl. X.R.

424—312, 342, 343